United States Patent
Miki

(10) Patent No.: US 9,362,548 B2
(45) Date of Patent: Jun. 7, 2016

(54) SOLID-STATE BATTERY ELECTRODE

(75) Inventor: Nariaki Miki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/997,762

(22) PCT Filed: Jan. 25, 2012

(86) PCT No.: PCT/IB2012/000098
§ 371 (c)(1),
(2), (4) Date: Jun. 25, 2013

(87) PCT Pub. No.: WO2012/101501
PCT Pub. Date: Aug. 2, 2012

(65) Prior Publication Data
US 2013/0295451 A1    Nov. 7, 2013

(30) Foreign Application Priority Data

Jan. 26, 2011    (JP) ................. 2011-013964

(51) Int. Cl.
| | |
|---|---|
| *H01M 10/0562* | (2010.01) |
| *H01M 4/131* | (2010.01) |
| *H01M 4/04* | (2006.01) |
| *H01M 4/139* | (2010.01) |
| *H01M 10/0525* | (2010.01) |
| *H01M 4/1391* | (2010.01) |
| *H01M 4/485* | (2010.01) |
| *H01M 4/505* | (2010.01) |
| *H01M 4/525* | (2010.01) |
| *H01M 4/02* | (2006.01) |

(52) U.S. Cl.
CPC ............... *H01M 4/131* (2013.01); *H01M 4/04* (2013.01); *H01M 4/0471* (2013.01); *H01M 4/139* (2013.01); *H01M 4/1391* (2013.01); *H01M 10/0525* (2013.01); *H01M 10/0562* (2013.01); *H01M 4/485* (2013.01); *H01M 4/505* (2013.01); *H01M 4/525* (2013.01); *H01M 2004/028* (2013.01); *H01M 2300/0068* (2013.01); *Y02E 60/122* (2013.01); *Y02P 70/54* (2015.11)

(58) Field of Classification Search
CPC ..................... H01M 10/0525; H01M 10/0562; H01M 2004/028; H01M 2300/0068; H01M 4/04; H01M 4/0471; H01M 4/131; H01M 4/139; H01M 4/1391; H01M 4/485; H01M 4/505; H01M 4/525; Y02E 60/122
USPC .......... 429/304, 209, 218.1, 231.95, 232, 251
See application file for complete search history.

(56) References Cited

U.S. PATENT DOCUMENTS

2009/0081554 A1* 3/2009 Takada et al. ................. 429/322

FOREIGN PATENT DOCUMENTS

| JP | A-5-290849 | 11/1993 |
|---|---|---|
| JP | A-2007-059409 | 3/2007 |
| JP | A-2008-4459 | 1/2008 |
| JP | 2010-225309 A | 10/2010 |
| WO | WO 2007/004590 A1 | 1/2007 |

* cited by examiner

Primary Examiner — Patrick Ryan
Assistant Examiner — Ben Lewis
(74) Attorney, Agent, or Firm — Oliff PLC

(57) ABSTRACT

The invention provides a solid-state battery electrode formed of a lithium ion conductor, an active material, and a solid electrolyte and including a granule that contains a plurality of lithium ion conductors and a plurality of active materials, as well as a method of producing a solid-state battery electrode that has a step of preparing a granule that contains a plurality of lithium ion conductors and a plurality of active materials and a step of uniformly mixing the granule with a solid electrolyte.

8 Claims, 6 Drawing Sheets

F I G . 1
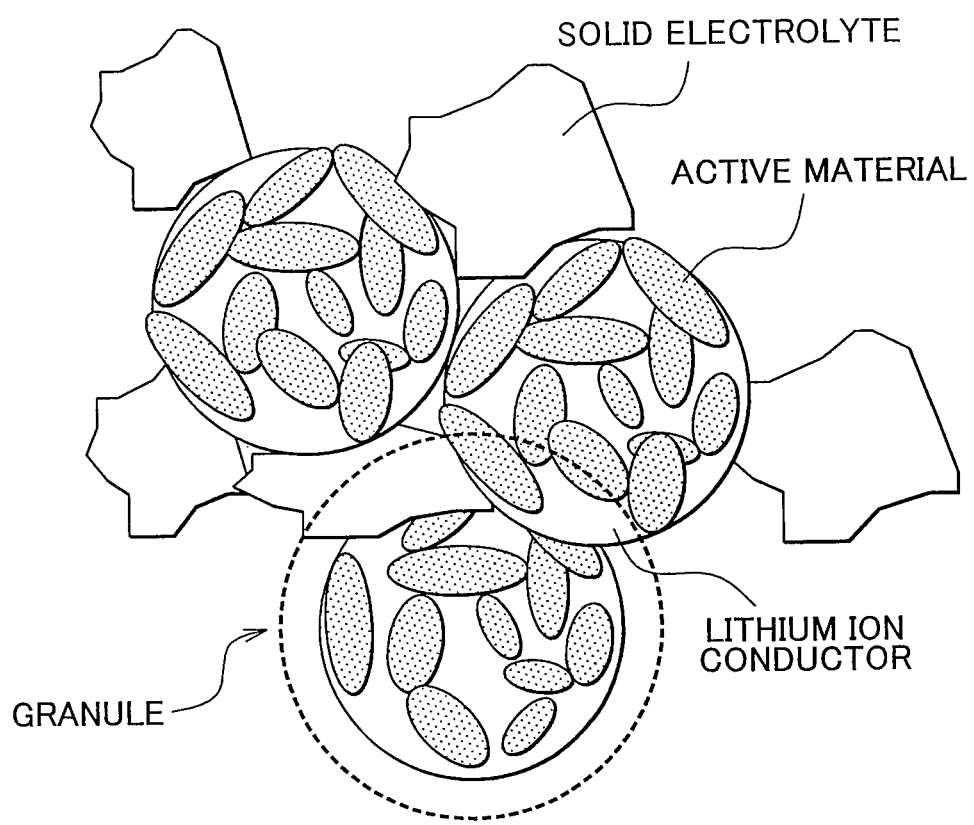

UNUTILIZABLE ACTIVE MATERIAL

SOLID ELECTROLYTE

SOLID-STATE BATTERY ELECTRODE

BACKGROUND OF THE INVENTION

1. Field of the Invention

The invention relates to a novel solid-state battery electrode and to a method of producing this electrode. The invention more particularly relates to a solid-state battery electrode that is formed of a lithium ion conductor, an active material, and a solid electrolyte each having a special structure and thereby can provide a high output when used in a solid-state battery, and to a method of producing this solid-state battery electrode.

2. Description of Related Art

Lithium batteries have entered into practical use in recent years as high voltage and high energy density batteries. Various investigations are underway in pursuit of additional improvements in lithium battery performance due to demands for higher performance levels and the desire to increase the application of lithium batteries into a broader range of fields. Among these investigations, there is desire for the realization of practical solid lithium batteries since they could offer many advantages over the heretofore used nonaqueous electrolyte-based lithium batteries, i.e., better safety, greater structural flexibility due to greater flexibility with regard to cell shape, and a reduction in auxiliary components.

However, such a solid lithium battery has remained unrealized to date. In order to obtain a solid lithium battery that can exhibit the characteristic features noted above, each of the electrodes, i.e., the positive electrode and the negative electrode, and the solid electrolyte must all be constructed of materials that can provide safety in combination with a high output. However, electrodes that can provide a high output and/or a solid electrolyte that can provide a high output have not yet been obtained.

With regard to electrodes, there have been investigations into electrodes for nonaqueous electrolyte-based lithium batteries and electrodes for solid-state lithium batteries. For example, Japanese Patent Application Publication No. 5-290849 (JP-A-5-290849) describes a positive electrode for a nonaqueous electrolyte-based secondary battery. This positive electrode uses a positive electrode active material that has a large particle diameter and is obtained by mixing, granulating, and baking starting inorganic compound powders. As a specific example here, the example is given of the production of $LiCoO_2$, which is one example of a positive electrode active material, by subjecting a mixture of lithium carbonate and cobalt oxide to stirring, mixing, and granulation.

In addition, Japanese Patent Application Publication No. 2008-004459 (JP-A-2008-004459) describes a sulfide electrolyte particle that has an average particle diameter of 0.1 to 10 μm and that can lower the solid electrolyte/electrode interfacial resistance. This sulfide electrolyte particle is obtained by subjecting a sulfide solid electrolyte particle to multistage milling in a nonaqueous vehicle or to dry milling using a jet mill. However, JP-A-2008-004459 does not provide a specific example in which a positive battery electrode is obtained from the sulfide electrolyte particle, a conductor, and an active material and also makes no reference to battery output.

Thus, while the related art has a positive electrode active material particle obtained by mixing, granulation, and baking and an electrolyte particle obtained by dry milling, it is quite difficult using these conventional materials to obtain a solid-state battery electrode that can provide a high output.

SUMMARY OF THE INVENTION

The invention provides a solid-state battery electrode that can provide a high output when used in a solid-state battery. The invention further provides a method of producing this solid-state battery electrode that can provide a high output when used in a solid-state battery.

As a result of intensive investigations in order to achieve the aforementioned objects, the inventors discovered that the reason why a high output-capable solid-state battery electrode is not obtained is that the electrolyte is a solid and an adequate interface is therefore not formed between the electrolyte and the active material, which has a very low lithium ion conductivity. The invention was achieved as a result of further investigations.

A first aspect of the invention relates to a solid-state battery electrode that is formed of a lithium ion conductor, an active material, and a solid electrolyte, wherein this electrode includes a granule that contains a plurality of lithium ion conductors and a plurality of active materials. A second aspect of the invention relates to a method of producing a solid-state battery electrode, the method including a step of preparing a granule that contains a plurality of lithium ion conductors and a plurality of active materials and a step of uniformly mixing the granule with a solid electrolyte.

A solid-state battery electrode that can provide a high output when used in a solid-state battery can be obtained according to the invention. In addition, the solid-state battery electrode capable of providing a high output when used in a solid-state battery can be easily obtained according to the invention.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a partially magnified schematic diagram of a solid-state battery electrode according to an embodiment of the invention;

DETAILED DESCRIPTION OF EMBODIMENTS

The invention is described through the following embodiments. 1) A solid-state battery electrode in which the active material is a positive electrode material. 2) A production method in which the step of preparing the aforementioned granule includes a step of preparing a granule that contains a lithium ion conductor raw material and active material and a step of baking the obtained granule. 3) A production method in which the step of preparing the aforementioned granule is a step that is carried out using a tumbling fluidized bed granulator.

Because the solid-state battery electrode containing a lithium ion conductor, active material, and solid electrolyte contains a granule that contains a plurality of lithium ion conductors and a plurality of active materials, movement of the lithium ion within the electrode is made possible and as a result a solid-state battery electrode capable of high output can be obtained. In addition, the method of producing the solid-state battery electrode—because it contains a step of preparing a granule that contains the lithium ion conductor and active material and a step of uniformly mixing the granule with a solid electrolyte—can easily provide a solid-state battery electrode capable of high output.

Embodiments of the invention are described below with reference to FIGS. 1 to 6. As shown in FIG. 1, the solid-state battery electrode of the invention contains a lithium ion conductor, active material, and solid electrolyte and contains a granule that is a composite particle that contains a plurality of lithium ion conductors and a plurality of active materials. While not providing a theoretical analysis for the increased solid-state battery output, the following is believed to occur. By having the structure described above, a granule is formed in which the active material, which carries the lithium ion storage function but which has a very low lithium ion transportability, forms a composite with the lithium ion conductor, which then makes possible lithium ion conduction within the granule. Lithium ion transfer within the electrode along the path solid electrolyte→lithium ion conductor→active material is made possible with the solid electrolyte, which has a lithium ion transport capacity, that is present in the electrode along with the granule.

Figure 2:
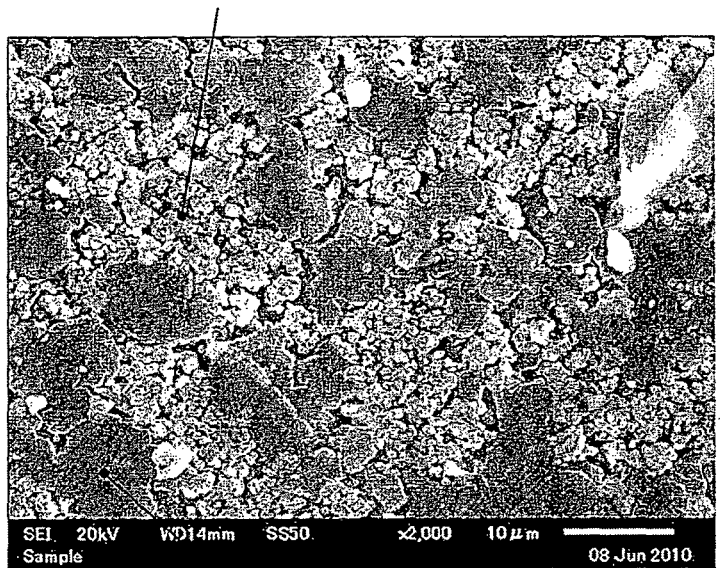
FIG. 2 is a reproduction of a scanning electro microscope (SEM) photograph of the surface of a solid-state battery electrode according to the related art.

In contrast to this, in the case of a conventional solid-state battery electrode as shown in FIG. 2, the active material has assumed an aggregated configuration and much active material is present in an isolated and unutilizable state. This is believed to impede the formation of the solid electrolyte/active material interface. As a means for solving this problem, one can contemplate reducing the size of the active material particles and solid electrolyte particles to the same uniform level. However, when this is done, the tendency of the microparticles to aggregate grows even stronger, and it has thus been difficult to bring about an increase in the solid electrolyte/active material interface in the industrial context.

Figure 3:
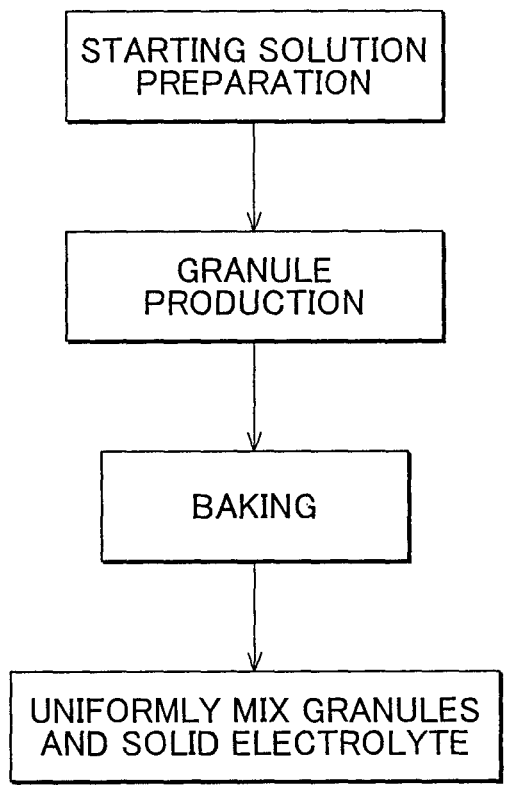
FIG. 3 is a schematic diagram that shows the production process for a solid-state battery electrode according to an embodiment of the invention.
Figure 4:
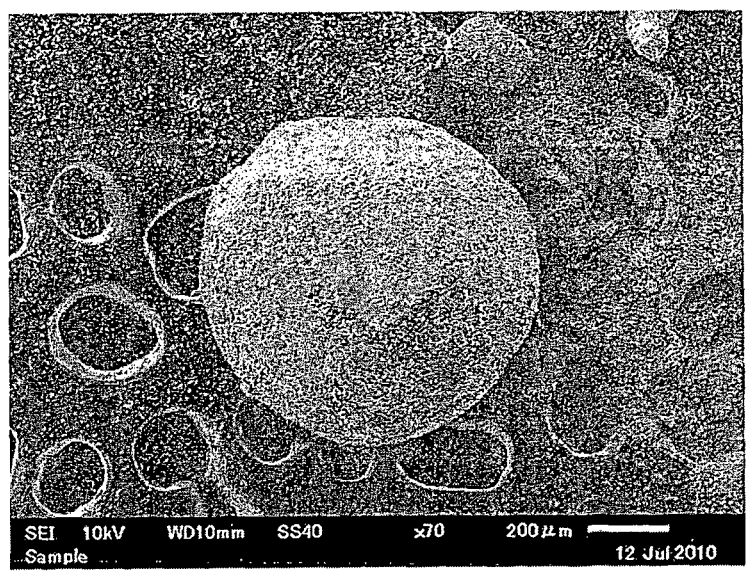
FIG. 4 is a reproduction of an electron micrograph of a granule according to an embodiment of the invention, which contains a lithium ion conductor and active material.

As shown in FIG. 3, a method of producing the solid-state battery electrode according to an embodiment of the invention has a step of preparing a starting solution serving as the lithium ion conductor raw material, a step of producing a granule that contains the lithium ion conductor raw material and the active material, a step of baking the obtained granule, and a step of uniformly mixing the obtained granule with a solid electrolyte. These steps provide a granule, for example, as shown in FIG. 4, that has a particle diameter of about 10 to 1000 μm and that contains within the particle a plurality (for example, 2 to 100) of lithium ion conductors and a plurality (for example, 2 to 100) of active materials. In contrast to this, a conventional granule is a single active material particle coated by a thin film of the lithium ion conductor.

Figure 5:
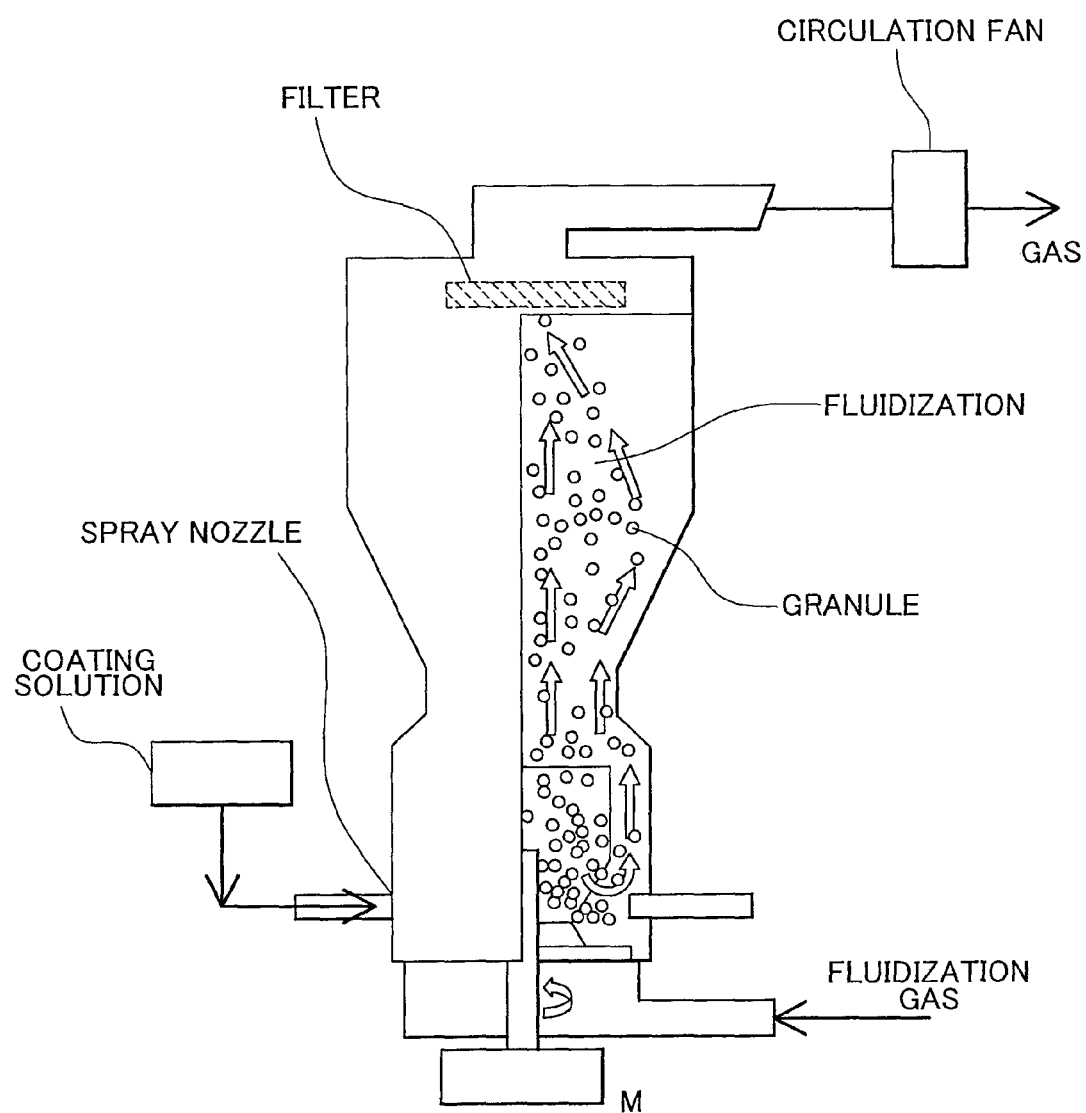
FIG. 5 is a schematic diagram of a tumbling fluidized bed granulator used to produce the granules in an example of the invention.

The aforementioned step of producing the granule can be carried out, for example, as shown in FIG. 5, using a tumbling fluidized bed granulator that is provided with a rotor at its bottom and that can bring the particles into a fluidized state in the device by the intake of a feed gas. In this embodiment, the granule is formed, for example, by spraying an organic solvent containing the lithium conductor raw material—for example, an alcohol solution, e.g., an ethanol, methanol, or isopropanol solution, and preferably an ethanol solution—on an active material powder residing in a fluidized state in the tumbling fluidized bed granulator and drying. Production then continues by baking the obtained granule in air or an inert atmosphere. The proportion between the lithium ion conductor and active material in this embodiment is lithium ion conductor: active material (mass ratio)=1:1 to 67,000:1 and, for example, preferably 5:1 to 25:1. The intake flow in this method for effecting particle fluidization is suitably about 0.05 to 2 $m^3/h$.

The intake temperature in the tumbling fluidized bed granulator in the aforementioned step of producing, the granule is set at, for example, from at least room temperature to not more than 50° C. When this is done, production of the previously described granule is thought to be achieved as follows. The alcohol containing the lithium conductor raw material is coated on the surface of the particulate active material and the surface assumes a wet state. As a result, growth occurs when another coated active material particles come into contact with a particular active material particle. This contact•growth occurs successively to yield a granule containing a plurality of active materials and a plurality of particulate lithium conductor raw materials. Drying of the obtained granule then achieves the production of the granule described above. The baking of the granule composed of the lithium ion conductor raw material and active substance is carried out by heating for about 1 to 10 hours at 100 to 350° C. in an inert atmosphere or air. In the particular case in which the lithium ion conductor is an oxide, baking may be carried out by heating using a muffle oven in air for about 1 to 10 hours at 100 to 350° C. and particularly 300 to 350° C.

The aforementioned granule must be uniformly mixed with a solid electrolyte in the embodiment of the invention. The baked granule and solid electrolyte may generally be mixed and dispersed to uniformity by dry mixing, for example, using a mixer, at a granule: solid electrolyte proportion, as the mass ratio, in the range from 1:10 to 10:1 and desirably in the range from 3:7 to 7:3, for example, in the range from 4:6 to 6:4. This mixing may also be performed by a wet method. The uniform mixing of this granule with the solid electrolyte provides a powder electrode mixture that constitutes a solid-state battery electrode, for example, a powder positive electrode mixture or a powder negative electrode mixture and advantageously a powder positive electrode mixture.

The lithium ion conductor in the embodiment of the invention must be a substance that does not react with the active material present in the granule or with the solid electrolyte that is another component in the electrode. Materials used as a solid electrolyte material in lithium secondary batteries can be exemplified by oxide-type noncrystalline solid electrolytes such as $LiTi_2(PO_4)_3$, $Li_2O$—$B_2O_3$—$P_2O_5$, $Li_2O$—$SiO_2$, $Li_2O$—$B_2O_3$, and $Li_2O$—$B_2O_3$—$ZnO$; sulfide-type noncrystalline solid electrolytes such as $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, $LiI$—$Li_3PO_4$—$P_2S_5$, $Li_3PS_4$, and $Li_2S$—$P_2S_5$; lithium-containing compounds that contain lithium and at least one element selected from niobium, tantalum, silicon, phosphorus, and boron, such as crystalline oxides and oxynitrides such as $LiNbO_3$, $Li_{1.3}Al_{0.3}Ti_{0.7}(PO_4)_3$, $Li_{1+x+y}A_xTi_{2-x}Si_yP_{3-y}O_{12}$ (A=Al or Ga, $0 \le x \le 0.4$, $0 < y \le 0.6$), $[(B_{1/2}Li_{1/2})_{1-z}C_z]TiO_3$ (B=La, Pr, Nd, Sm, C=Sr or Ba, $0 \le x \le 0.5$), $Li_5La_3Ta_2O_{12}$, $Li_7La_3Zr_2O_{12}$, $Li_6BaLa_2Ta_2O_{12}$, $Li_3PO_{(4-3/2w)}N_w$ (w<1), and $Li_{3.6}Si_{0.6}P_{0.4}O_4$; as well as LiI, LiI—$Al_2O_3$, $LiN_3$, and $Li_3N$—LiI—LiOH. The lithium ion conductor raw material referenced above can be exemplified by the alkoxides of the metal elements present in the lithium ion conductor compound, for example, the ethoxide. Accordingly, the alkoxides of the individual metal elements can be used for a lithium ion conductor raw material that contains two or more metal elements, for example, a combination of ethoxides can be used.

The active material in this embodiment can be exemplified by lithium cobaltate ($Li_xCoO_2$), lithium nickelate ($Li_xNiO_2$), lithium nickel manganese cobaltate ($Li_{1+x}Ni_{1/3}Mn_{1/3}Co_{1/3}O_2$), lithium nickel cobaltate ($LiCo_{0.3}Ni_{0.7}O_2$), lithium manganate ($Li_xMn_2O_4$), lithium titanate ($Li_{4/3}Ti_{5/3}O_4$), lithium manganate compounds ($Li_{1+x}M_yMn_{2-x-y}O_4$, M=Al, Mg, Fe, Cr, Co, Ni, Zn), lithium titanate ($Li_xTiO_y$), lithium metal phosphate ($LiMPO_4$, M=Fe, Mn, Co, Ni), vanadium oxide ($V_2O_5$), molybdenum oxide ($MoO_3$), titanium sulfide ($TiS_2$), lithium cobalt nitride (LiCoN), lithium silicon nitride ($LiSi_2N_3$), lithium metal, lithium alloys (LiM, M=Sn, Si, Al, Ge, Sb, P), lithium-storage intermetallic compounds ($Mg_xM$, M=Sn, Ge, Sb or $X_ySb$, X=In, Cu, Mn), and derivatives of the preceding, and by carbon materials (C) such as graphite and hard carbon. There is no clear distinction here into positive electrode active materials and negative electrode active materials, and an electrode with a freely selected voltage may be constructed by comparing the charge-discharge potentials of two compounds and using the one with the nobler potential for the positive electrode and the one with the baser potential for the negative electrode. Particular examples of positive electrode active materials are $Li_xCoO_2$, $Li_xNiO_2$, $Li_xMn_2O_4$, $Li_xNi_{1/2}Mn_{1/2}O_2$, $Li_xNi_{1/3}Co_{1/3}Mn_{1/3}O_2$, $Li_x[Ni_yLi_{1/3-2y/3}]O_3$ ($0 \leq x \leq 1$, $0 < y < 1/2$), and lithium transition metal oxides, e.g., $LiNiMnCoO_2$, as provided by replacing the lithium or transition metal in the preceding lithium transition metal oxides with another element. In addition, a particularly favorable examples of a negative electrode active material is a carbon material (C) such as graphite or hard carbon.

The solid electrolyte in this embodiment may be, for example, a material that can be used as a solid electrolyte material in a lithium secondary battery. Examples here are oxide-type noncrystalline solid electrolytes such as $Li_2O$—$B_2O_3$—$P_2O_5$, $Li_2O$—$SiO_2$, $Li_2O$—$B_2O_3$, and $Li_2O$—$B_2O_3$—ZnO; sulfide-type noncrystalline solid electrolytes such as $Li_2S$—$SiS_2$, LiI—$Li_2S$—$P_2S_5$, LiI—$Li_2S$—$B_2S_3$, $Li_3PO_4$—$Li_2S$—$Si_2S$, $Li_3PO_4$—$Li_2S$—$SiS_2$, $LiPO_4$—$Li_2S$—SiS, LiI—$Li_2S$—$P_2O_5$, LiI—$Li_3PO_4$—$P_2S_5$, $Li_3PS_4$, and $Li_2S$—$P_2S_5$; and crystalline oxides and oxynitrides such as LiI, LiI—$Al_2O_3$, $Li_3N$, $Li_3N$—LiI—LiOH, $Li_{1.3}Al_{0.3}Ti_{0.7}(PO_4)_3$, $Li_{1+x+y}A_xTi_{2-x}Si_yP_{3-y}O_{12}$ (A=Al or Ga, $0 \leq x \leq 0.4$, $0 < y \leq 0.6$), $[(B_{1/2}Li_{1/2})_{1-z}C_z]TiO_3$ (B=La, Pr, Nd, Sm, C=Sr or Ba, $0 \leq x \leq 0.5$), $Li_5La_3Ta_2O_{12}$, $Li_7La_3Zr_2O_{12}$, $Li_6BaLa_2Ta_2O_{12}$, $Li_3PO_{(4-3/2w)}N_w$ ($w<1$), and $Li_{3.6}Si_{0.6}P_{0.4}O_4$.

The granule of this embodiment must contain the previously described active material and the previously described lithium ion conductor as essential components, but in addition to these components may contain an electroconductive material in order to improve the electronic conductivity. The proportion of the electroconductive material in the granule may be not more than 5 mass %. This electroconductive material can be exemplified by acetylene black, Ketjen black, finely divided spherical carbon particles, carbon nanotubes, and carbon nanofibers. The electrode of this embodiment contains the lithium ion conductor, active material, and solid electrolyte as essential components, but in addition to the other components may contain not more than 10 mass % and preferably not more than 5 mass % of a component such as an electroconductive material in order to improve the electronic conductivity.

When a positive electrode for a solid-state battery is to be obtained in this embodiment, a positive electrode material, for example, $Li_xCoO_2$, $Li_xNiO_2$, $Li_xMn_2O_4$, $Li_xNi_{1/2}Mn_{1/2}O_2$, $Li_xNi_{1/3}Co_{1/3}Mn_{1/3}O_2$, $Li_x[Ni_yLi_{1/3-2y/3}]O_3$ ($0 \leq x \leq 1$, $0<y<1/2$), and lithium transition metal oxides, e.g., $LiNiMnCoO_2$, as provided by replacing the lithium or transition metal in the preceding lithium transition metal oxides with another element, is used as the active material in the previously described steps. When a negative electrode for a solid-state battery is to be obtained in this embodiment, a negative electrode active material, for example, a carbon material (C) such as graphite or hard carbon, is used for the active material.

When a solid-state battery is to be obtained using the solid-state battery electrode of this embodiment, an electrode obtained according to this embodiment may be used for both the positive electrode and the negative electrode or may be used for either the positive electrode or the negative electrode and is favorably used for the positive electrode. An electrode other than the electrode of the invention may be used for the other electrode, for example, the negative electrode. To fabricate a solid-state battery, for example, a suitable solid electrolyte is introduced into a cell and pressed to produce a solid electrolyte layer as a pellet; the powder positive electrode mixture and the powder negative electrode mixture are then introduced at the two sides of the solid electrolyte layer; and pressing is performed. The solid-state battery may also be fabricated by first pressing the powder positive electrode mixture and the powder negative electrode mixture to carry out pelletization and form the positive and negative electrodes and by then forming an electrolyte layer between the two electrodes. Or, for example, fabrication may be carried out by dispersing the previously described powder positive electrode mixture in a solvent; coating this on a metal foil current collector to form an electrode; then similarly forming the electrolyte layer by coating; then forming the negative electrode using a powder negative electrode mixture; and finally laminating a metal foil current collector.

An example of the invention is given below. This example is provided simply for purposes of explanation and does not limit the invention. Parts refers to mass parts in the description that follows. The tumbling fluidized bed granulator (MP-01 from the Powrex Corporation) shown by the schematic drawing in FIG. 5 was used in each of the following examples for the granulator or coating device. The particle diameter of the granules was determined by electron microscopic observation in each of the following examples. The electron microscopic observation of the granules was carried out using the following instrument. The electron microscope was from JEOL Ltd.

EXAMPLE 1

The lithium ion conductor in the granule was synthesized by a sol-gel method. The alkoxide solution serving as the raw material for the $LiNbO_3$ lithium ion conductor was prepared by dissolving niobium pentaethoxide and lithium ethoxide (both from Kojundo Chemical Laboratory Co., Ltd.) in ethanol and adjusting to a solids fraction content of 6 mass %. 1600 g of the ethanol solution of these alkoxides was sprayed onto 1 kg $LiNi1/3Mn1/3Co1/3O_2$ (from Nichia Corporation) as the active material. Granules were formed at this point using the following conditions: intake temperature=50° C., intake flow rate=0.2 m³/hour, rotor rpm=300 rpm, spray rate=5 g/minute. Baking was carried out at 350° C. and 5 hours using a muffle oven in order to convert the LiNbO$_3$ precursor in the granules to the oxide. The baked granules were then mixed and dispersed to uniformity using a test tube mixer with the sulfide-type solid electrolyte Li$_3$PS$_4$ at a mass ratio of 5:5 to produce a positive electrode mixture. The granules were submitted to electron microscopic observation. A reproduction of the electron micrograph is shown in FIG. 4.

A negative electrode mixture was prepared by mixing and dispersing as for the positive electrode by mixing a layered carbon negative electrode active material (Mitsubishi Chemical Corporation) with the previously described solid electrolyte at a mass ratio of 5:5. The previously described solid electrolyte was introduced into a cell and pressed to fabricate an electrolyte layer in the form of a pellet. The positive electrode mixture and negative electrode mixture were then introduced on the two sides of the electrolyte layer and pressed to fabricate a pressed-powder battery.

Figure 6:
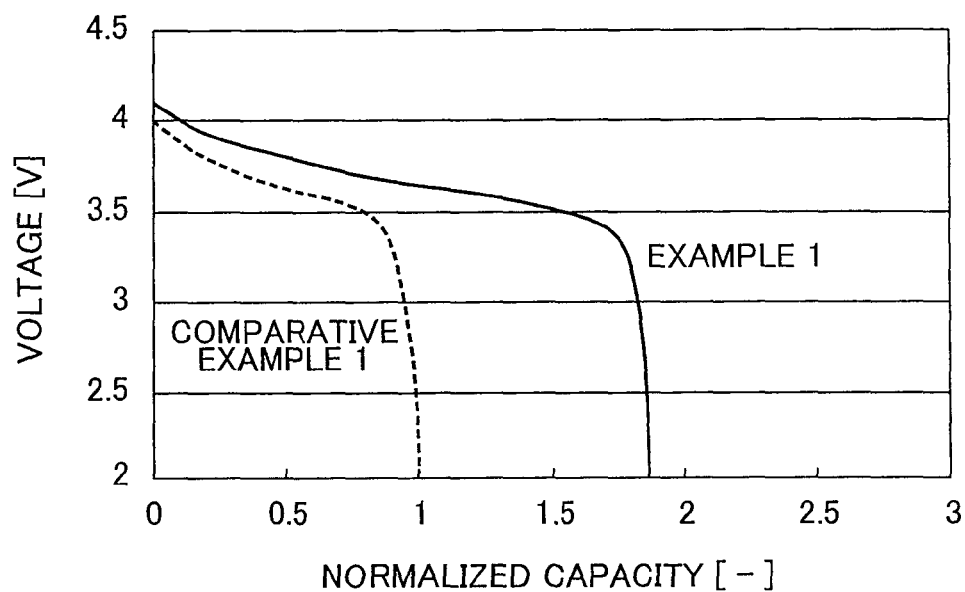
FIG. 6 is a graph that compares the discharge curve of a solid-state battery that uses a solid-state battery electrode obtained in an example of the invention with the discharge curve of a solid-state battery that uses a solid-state battery electrode outside the scope of the invention.

To evaluate the obtained solid-state battery, the battery was charged by constant current/constant voltage (CCCV) at 4.2 V and was then discharged from 4.2 V to 2.0 V at a 1 C rate. The results for the obtained discharge curve are shown in FIG. 6 together with the results from the comparative example. The measurement result for the output is shown in FIG. 7 together with the result from the comparative example.

COMPARATIVE EXAMPLE 1

A uniform thin film layer of the lithium ion conductor LiNbO$_3$ was formed on the surface of particles of the active material LiNi1/3Mn1/3Co1/3O$_2$. The operating conditions at this time for the tumbling fluidized bed granulator shown in FIG. 5 were as follows: intake temperature=80° C., intake flow rate=0.3 m$^3$/hour, rotor rpm=300 rpm, spray rate=4 g/minute. The baking conditions were 350° C. for 5 hours. The positive electrode mixture, negative electrode mixture, and pressed-powder battery were then fabricated proceeding as in Example 1. SEM measurement was performed on the surface of the obtained electrode. A reproduction of the obtained SEM photograph is shown in FIG. 2. The battery was also evaluated as in Example 1. The obtained results are shown in FIGS. 6 and 7 along with the results for the example.

Figure 7:
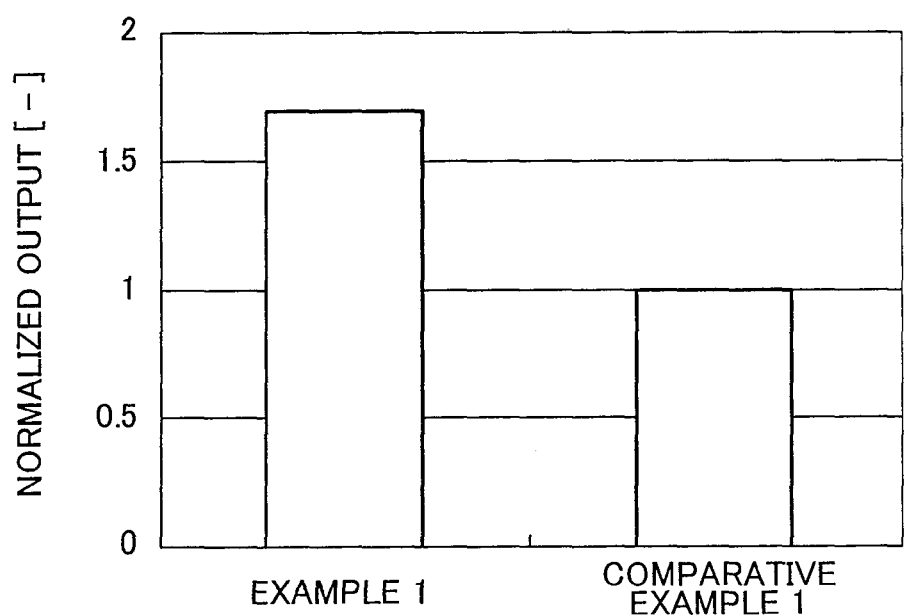
FIG. 7 is a graph that compares the output of a solid-state battery that uses a solid-state battery electrode obtained in an example of the invention with the output of a solid-state battery that uses a solid-state battery electrode outside the scope of the invention.

The results in FIG. 7 confirmed that the solid-state battery according to the example—which contained a lithium ion conductor, active material, and solid electrolyte and used a solid-state battery positive electrode that contained a granule that contained a plurality of lithium ion conductors and a plurality of active materials—had a higher output than the solid-state battery of the comparative example, which contained a lithium ion conductor, active material, and solid electrolyte and used a solid-state battery positive electrode that contained a particle in which a thin film of the lithium ion conductor was formed on the active material particle.

The invention can provide a solid-state battery electrode that can provide a high-output solid-state battery, and the invention also makes it possible to easily obtain a solid-state battery electrode that can provide a high-output solid-state battery.

The invention claimed is:

1. A solid-state battery electrode comprising:
 a granule that contains a composite precursor granule comprised of a plurality of lithium ion conductors and a plurality of active materials, wherein the plurality of active materials are formed as separate active material regions interspersed in the plurality of lithium ion conductors, and the granule is a composite particle formed by the composite precursor granule and a solid oxide electrolyte; and
 a solid electrolyte,
 wherein the solid electrolyte is in direct contact with at least one of the separate active material regions.

2. The solid-state battery electrode according to claim 1, wherein the active material is a positive electrode active material.

3. The solid-state battery electrode according to claim 1, wherein a mass ratio between the lithium ion conductor and the active material is 5:1 to 25:1.

4. The solid-state battery electrode according to claim 1, wherein the solid electrolyte is a sulfide solid electrolyte.

5. A method of producing a solid-state battery electrode, the method comprising:
 preparing a plurality of precursor granules that each comprise a raw material of a lithium ion conductor and an active material, wherein each precursor granule is prepared by:
  preparing an organic solvent solution of the raw material of the lithium ion conductor, and
  coating the active material with the organic solvent solution of the raw material of the lithium ion conductor in a tumbling fluidized bed granulator to form the plurality of precursor granules;
 contacting the plurality of the precursor granules with each other to form at least one composite precursor granule;
 preparing a granule that contains the at least one composite precursor granule such that the composite precursor granule contains a plurality of the lithium ion conductors and a plurality of the active materials, wherein the plurality of active materials are formed as separate active material regions interspersed in the plurality of lithium ion conductors; and
 uniformly mixing the granule with a solid electrolyte such that at least one of the separate active material regions is in direct contact with the solid electrolyte,
 wherein during the preparation of the at least one composite precursor granule in the tumbling fluidized bed granulator, an intake temperature of the tumbling fluidized bed granulator is adjusted to a temperature at which a surface of the active material coated with the organic solvent solution is wet.

6. The method of producing a solid-state battery electrode according to claim 5, wherein granule preparation comprises baking the at least one composite precursor granule.

7. The method of producing a solid-state battery electrode according to claim 5, wherein a mass ratio between the lithium ion conductor and the active material is 5:1 to 25:1.

8. The method of producing a solid-state battery electrode according to claim 5, wherein the intake temperature of the tumbling fluidized bed granulator is at least room temperature and not more than 50° C.

* * * * *